United States Patent
Dadd

(10) Patent No.: US 9,966,817 B2
(45) Date of Patent: May 8, 2018

(54) ELECTROMECHANICAL TRANSDUCER

(71) Applicant: Isis Innovation Limited, Summertown, Oxford (GB)

(72) Inventor: Michael William Dadd, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 549 days.

(21) Appl. No.: 14/407,604

(22) PCT Filed: May 30, 2013

(86) PCT No.: PCT/GB2013/051433
§ 371 (c)(1),
(2) Date: Dec. 12, 2014

(87) PCT Pub. No.: WO2013/186529
PCT Pub. Date: Dec. 19, 2013

(65) Prior Publication Data
US 2015/0171706 A1 Jun. 18, 2015

(30) Foreign Application Priority Data
Jun. 14, 2012 (GB) .................................. 1210567.2

(51) Int. Cl.
*H02K 7/18* (2006.01)
*H02K 5/128* (2006.01)
(Continued)

(52) U.S. Cl.
CPC ........... *H02K 7/1876* (2013.01); *F02G 1/043* (2013.01); *H02K 5/1282* (2013.01);
(Continued)

(58) Field of Classification Search
CPC ...... H02K 41/00–41/065; H02K 33/00–33/18; H02K 35/02; H02K 5/128; H02K 1/141
(Continued)

(56) References Cited

U.S. PATENT DOCUMENTS 3,633,053 A 1/1972 Peters
4,623,808 A 11/1986 Beale et al.
(Continued)

FOREIGN PATENT DOCUMENTS

EP 0139372 5/1985
FR 2968147 6/2012
(Continued)

OTHER PUBLICATIONS

Bailey et al., An oil-free linear compressor for use with compact heat exchangers, Institution of Mechanical Engineers—International Conference on Compressors and their Systems, 2009, pp. 259-268.
(Continued)

*Primary Examiner* — Thomas Truong
(74) *Attorney, Agent, or Firm* — Bell & Manning, LLC

(57) ABSTRACT

An improved electromechanical transducer is provided. In an embodiment, the transducer comprises at least two flux modules, each defining a magnetic circuit having a gap; an armature configured to move along a longitudinal axis passing through the gaps; and a gas containment structure laterally surrounding the armature, wherein: the at least two flux modules are provided outside the gas containment structure; and the armature comprises a reinforcing portion laterally outside of the gaps that is wider in a direction parallel to the flux in the gaps than at least one of the gaps.

18 Claims, 8 Drawing Sheets

(51) Int. Cl.
  *H02K 41/03*  (2006.01)
  *F02G 1/043*  (2006.01)
  *H02K 35/02*  (2006.01)
  *F25B 9/14*   (2006.01)

(52) U.S. Cl.
  CPC .......... *H02K 7/1884* (2013.01); *H02K 35/02* (2013.01); *H02K 41/031* (2013.01); *F02G 2280/10* (2013.01); *F25B 9/14* (2013.01); *H02K 2213/12* (2013.01)

(58) Field of Classification Search
  USPC ................ 310/86, 12.01–12.33; 60/516–531
  See application file for complete search history.

(56) References Cited

U.S. PATENT DOCUMENTS

| | | | |
|---|---|---|---|
| 5,146,750 A * | 9/1992 | Moscrip | F02G 1/0435 60/517 |
| 5,389,844 A | 2/1995 | Yarr et al. | |
| 5,654,596 A | 8/1997 | Nasar et al. | |
| 6,271,606 B1 * | 8/2001 | Hazelton | G03F 7/70758 250/491.1 |
| 6,809,452 B2 * | 10/2004 | Cho | H02K 1/143 310/216.001 |
| 6,930,414 B2 | 8/2005 | Qiu | |
| 7,247,957 B2 | 7/2007 | Dadd | |
| 2002/0053833 A1 | 5/2002 | Kim et al. | |
| 2003/0048019 A1 | 3/2003 | Sadarangani et al. | |
| 2004/0080217 A1 | 4/2004 | Ota et al. | |
| 2005/0029874 A1 * | 2/2005 | Dadd | H02K 35/02 310/12.12 |
| 2006/0119215 A1 | 6/2006 | Ritz et al. | |
| 2009/0039717 A1 | 2/2009 | Jajtic et al. | |
| 2009/0051227 A1 * | 2/2009 | Kim | H02K 41/03 310/12.24 |
| 2011/0241449 A1 * | 10/2011 | Aoyama | H02K 41/03 310/12.05 |

FOREIGN PATENT DOCUMENTS

| | | |
|---|---|---|
| JP | H02246762 | 10/1990 |
| JP | H10174418 | 6/1998 |
| JP | H1169761 | 3/1999 |

OTHER PUBLICATIONS

Thome et al., Refrigerated Cooling of Microprocessors with Micro-Evaporation, Proc. Inst. Refrigeration, 2008, pp. 2-1-2-10.
International Search Report and Written Opinion issued in PCT/GB2013/051433, dated Sep. 9, 2014.
Search Report issued in British Application No. GB1210567.2, dated Sep. 19, 2012.

* cited by examiner

ELECTROMECHANICAL TRANSDUCER

This application is a National Stage of International Application No. PCT/GB2013/051433, filed May 30, 2013, which claims the benefit of GB Patent Application No. 1210567.2, filed Jun. 14, 2012, the contents of which are herein incorporated by reference.

The present invention relates to electromechanical transducers, in particular those configured to act as linear electric motors or linear electric generators.

Linear electric motors/generators are used in a wide range of applications, and as a consequence there is a large choice of different configurations available in the prior art. These include moving coil, moving magnet and moving iron designs, each of which has certain advantages and certain disadvantages.

Moving coil linear electric motors/generators tend to require flexible current leads and a relatively large amount of magnet material, which can result in high manufacturing costs.

Moving magnet and moving iron linear electric motors/generators tend to be rather complex in structure and can suffer from a lack of robustness. In addition, it can be difficult to integrate such systems with other apparatus. In general, these motors/generators comprise a plurality of magnetic circuits formed by annular cores with air gaps. The air gaps are aligned along a direction of linear movement of an armature that is received in the air gaps. Coils wound on the cores generate magnetic flux for driving movement of the armature or link with magnetic flux generated by movement of the armature.

One particular difficulty with integrating prior art linear electric motors/generators with other apparatus arises when the armature needs to move within a volume that is maintained at a pressure different to the pressure of the surrounding environment. This may be required, for example, when the linear motor/generator is to be used in conjunction with a Stirling cycle engine.

Bailey, P. B., Dadd, M. W., & Stone, C. R. (2009). An oil-free linear compressor for use with compact heat exchangers. *Institution of Mechanical Engineers—International Conference on Compressors and their Systems,* 259-267, discloses a motor configuration for use in cooling electronic components, for example a CPU in a computer. The disclosed configuration addresses some of the difficulties associated with producing an efficient linear motor in which the armature is required to move through a pressurised volume. The basic structure of the motor is illustrated schematically in FIG. 1. An armature 10 is provided that is configured to move linearly along a longitudinal axis through air gaps in a plurality of magnetic circuits 2. The magnetic circuits 2 are configured to provide the flux transversely relative to the longitudinal direction of motion of the armature 10. The circuits 2 constitute the static part of the motor. Each comprises a laminated core 4 and a coil 6 wound around it. The cores 4 are slotted and the sides of the slot form pole pieces that define the air gap. The air gaps are rectangular in form. The cores 4 are positioned such that all the air gaps are aligned along the motor axis. The disposition of neighbouring cores 4 alternate so that the coils 6 do not obstruct each other. The armature 10 constitutes the moving part of the motor and includes a plurality of rectangular magnets 8 arranged in a line and configured to move through the linearly aligned air gaps. The polarities of the magnets 8 alternate.

Axial movement of the armature 10 has the effect of varying the magnetic flux through the cores 4, which induces voltages in the coils 6; the polarity being opposite for neighbouring cores 4. If an alternating current of appropriate plurality is applied to the coils 6 then an alternating axial force is developed as desired.

The disclosed motor is integrated with a linear suspension system. FIG. 1 shows schematically how the armature 10 is connected to a linear spring 12 of the linear suspension system. In the arrangement disclosed, the motor is configured to operate as part of a compressor. The disclosed compressor has a substantially one-piece compressor body to which all the main static components of the motor are attached. In the disclosed configuration, the coils 6 are located outside of the pressure vessel 14 within which the armature 10 moves. The part of the pressure vessel 14 surrounding the armature 10 consists of a rectangular tube that is positioned in the air gap and sealed at both ends into the compressor body.

The linear suspension system is configured by providing two spring assemblies attached to the end of the compressor body. The inner connection between the two spring assemblies is made by the armature 10 (or elements rigidly connected to the armature) contained in the rectangular tube. The piston of the compressor is cantilevered from the moving magnet assembly and the cylinder is fixed to the end of the compressor body.

For long life, it is essential that the radial clearance between the piston and cylinder of the compressor is maintained, and this requires that the armature structure is stiff, and that the radial stiffness of the suspension system is sufficiently high.

For a moving magnet design, this is challenging even in the context of relatively small applications, such as cooling systems for electronic components. The moving magnets 8 cause significant off-axis reluctant forces on the armature 10. Increasing the thickness of the armature 10 is problematic because it increases the size of the air gap in the cores 4. A relatively large amount of magnetic energy is required to maintain flux across the gap, so there is a significant cost associated with larger air gaps. A further problem is that significant eddy currents tend to be generated in the material forming the walls of any part of the pressure containment vessel 14 that is located in the air gaps. This problem is expected to lead to significant losses were the configuration of FIG. 1 to be applied to larger machines in a scaled up form (with more pressure containment vessel wall material in the air gaps, for example due to thicker vessel walls or wider air gaps).

An alternative approach taken in the prior art for implementing linear motors/generators in larger scale applications, for example in Stirling engine applications operating in the region of 10 kW (which would require about 100 bar fill pressure in the pressure containment vessel) is to enclose the entire motor/generator assembly within the pressure containment vessel. However, this approach has several disadvantages. Firstly, the pressure containment vessel volume would need to become very large, significantly increasing material requirements, weight and cost. Secondly, the need for electrical leads to be brought through to the motor/generator coils adds further cost, and/or increases the chance of failure due to leakage. Thirdly, heat rejected from the coils may be more difficult to remove, particularly at larger sizes. Conduction alone may be inadequate for removing the heat, for example, forcing use of more complex and costly measures, such as liquid cooling.

It is an object of the invention to address at least one of the problems discussed above in relation to the prior art.

According to an object of the invention, there is provided an electromechanical transducer, comprising: at least two flux modules, each defining a magnetic circuit having a gap; an armature configured to move along a longitudinal axis passing through the gaps; and a gas containment structure laterally surrounding the armature, wherein: the at least two flux modules are provided outside the gas containment structure; and the armature comprises a reinforcing portion laterally outside of the gaps that is wider in a direction parallel to the flux in the gaps than at least one of the gaps.

According to an object of the invention, there is provided an electromechanical transducer, comprising: at least two flux modules, each defining a magnetic circuit having a gap; an armature configured to move along a longitudinal axis passing through the gaps; and a gas containment structure laterally surrounding the armature, wherein: the at least two flux modules are provided outside the gas containment structure; each of the flux modules comprises a first core defining the gap and a second core for supporting coils for linking with or generating flux in the magnetic circuit of the flux module; and the second core is detachably connected to the first core.

Thus, an electromechanical transducer is provided in which a gas containment structure is provided around an armature but not around flux modules providing magnetic flux that traverses the armature, and in which the stiffness of the armature can be maintained at a sufficiently high level without requiring gaps in the magnetic circuits to be excessively large. This is achieved by providing reinforcing portions that are naturally outside of the gaps and thus not constrained in size by the thickness of the gaps. The structure is such that the armature can be stiffened effectively for example against off-axis reluctance forces, where magnets are provided in the armature, without reducing the electrical efficiency of the transducer.

In an embodiment, each of the flux modules comprises a first core that defines a gap and a second core that supports coils for linking with or generating flux in the magnetic circuit of the flux module. The second core supporting the coils is optionally detachably connected to the first core. Arranging for the second core and its associated coils to be detachably connected allows a single motor assembly to be the basis for a range of machines that operate at different voltages. It also facilitates the replacement of failed coils.

In an embodiment, the gas containment structure is supported laterally over a predetermined longitudinal length by the first cores of the flux modules and/or by a frame for supporting the flux modules. Either or both of these elements may for example be provided so as to be flush against an outer surface of the pressure container volume in all lateral directions over the predetermined longitudinal length. The strength required of the gas containment structure is thus minimal in contrast to pressure containment structures used in prior art arrangements of the type illustrated in FIG. 1, for example, where lateral support is not provided sufficiently in all directions if at all. The gas containment structure is thus only required to resist penetration by gas. The thickness of the gas containment structure can therefore be made very low, regardless of device size or output power. Reducing the thickness of the gas containment structure reduces losses associated with eddy currents in the gas containment structure. In many applications it will be possible to use a wall thickness for the gas containment structure that is less than 0.5 mm, or even less than 0.2 mm.

The small wall thickness of the gas containment structure means that sheet material can be used, which reduces manufacturing costs relative to structures having thicker walls requiring more involved machining.

In an embodiment, the transducer is configured to operate as a linear electric motor. In another embodiment, the transducer is configured to operate as a linear electric generator.

According to an alternative aspect of the invention, a Stirling cycle engine is provided that uses a transducer according to an embodiment of the invention.

Embodiments of the invention will now be described, by way of example only, with reference to the accompanying drawings in which corresponding reference symbols represent corresponding parts, and in which.

Figure 1:
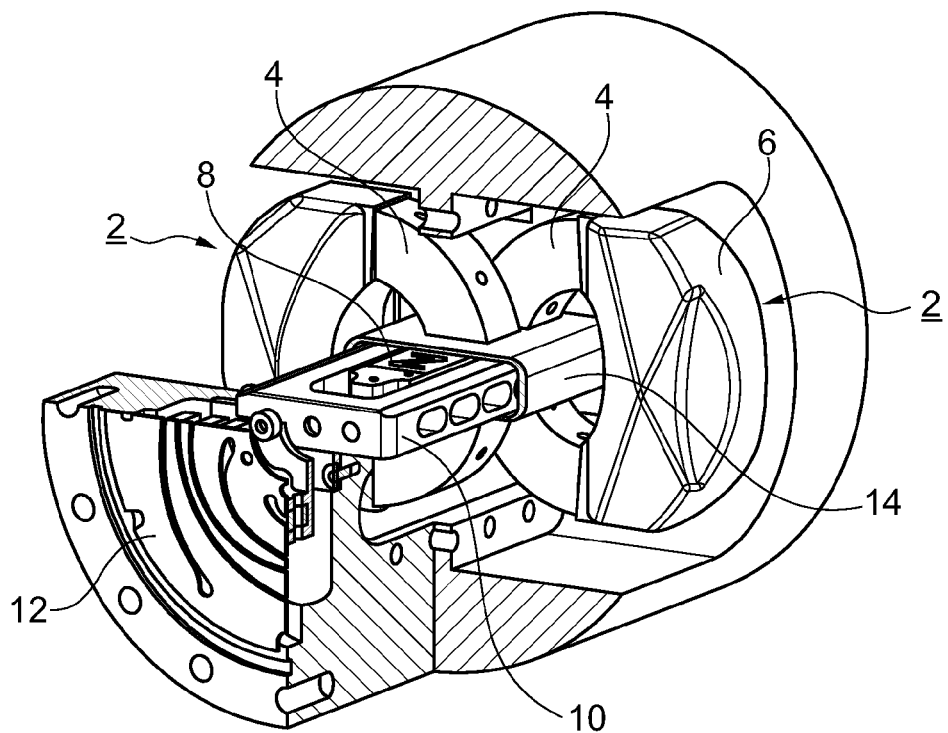
FIG. 1 depicts a prior art motor for an oil-free refrigeration system for cooling electronic components.
Figure 2:
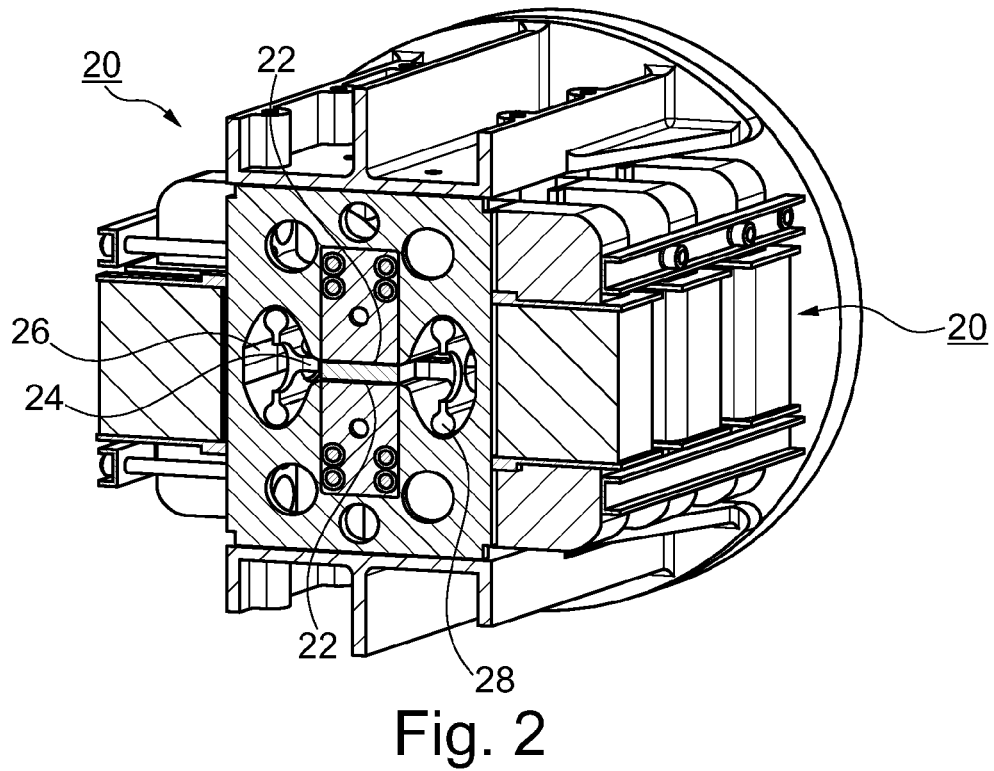
FIG. 2 depicts an electromechanical transducer according to the present disclosure.

FIG. 2 is a schematic sectional view of an example electromechanical transducer. In this embodiment, the transducer comprises a plurality of flux modules 20. Each of the flux modules 20 comprises a core defining a magnetic circuit. The magnetic circuit has a gap 22 through which a portion of an armature 24 can move along a longitudinal axis. A gas containment structure 26 is provided outside of the armature 24. The gas containment structure 26 laterally surrounds the armature 24. The gas containment structure 26 is configured to be impermeable to the gas in the volume through which the armature 24 moves. The gas containment structure 26 defines a volume that is separated from the volume within which components outside of the gas containing structure 26 are located. In the embodiment shown, the flux modules 20 are entirely provided outside of the gas containment structure 26.

In order to avoid requiring a gap 22 that is excessively thick in the direction parallel to the flux traversing the gap (in the vertical direction in the orientation of the figures), the armature 24 is provided with a reinforcing portion 28 that is laterally outside of the gaps 22. The reinforcing portion 28 is configured to be wider in the direction parallel to the flux in the gaps 22 than at least one of the gaps 22 themselves. In the orientation of figures, the thickness of the reinforcing portion 28 in the vertical direction is greater than the thickness of the gaps 22 in the vertical direction. This configuration enables the armature 24 to be made stiffer and thus resistant for example to off-axis reluctance forces acting in the vertical direction, without requiring the gaps 22 to be made excessively large. The gas containment structure 26 has a cross-sectional shape, therefore, that is thinner in a central region than in one or both of the lateral side regions outside of the gaps 22. In the example shown, the cross-sectional adopts a so-called "dog bone" shape.

Figure 3:
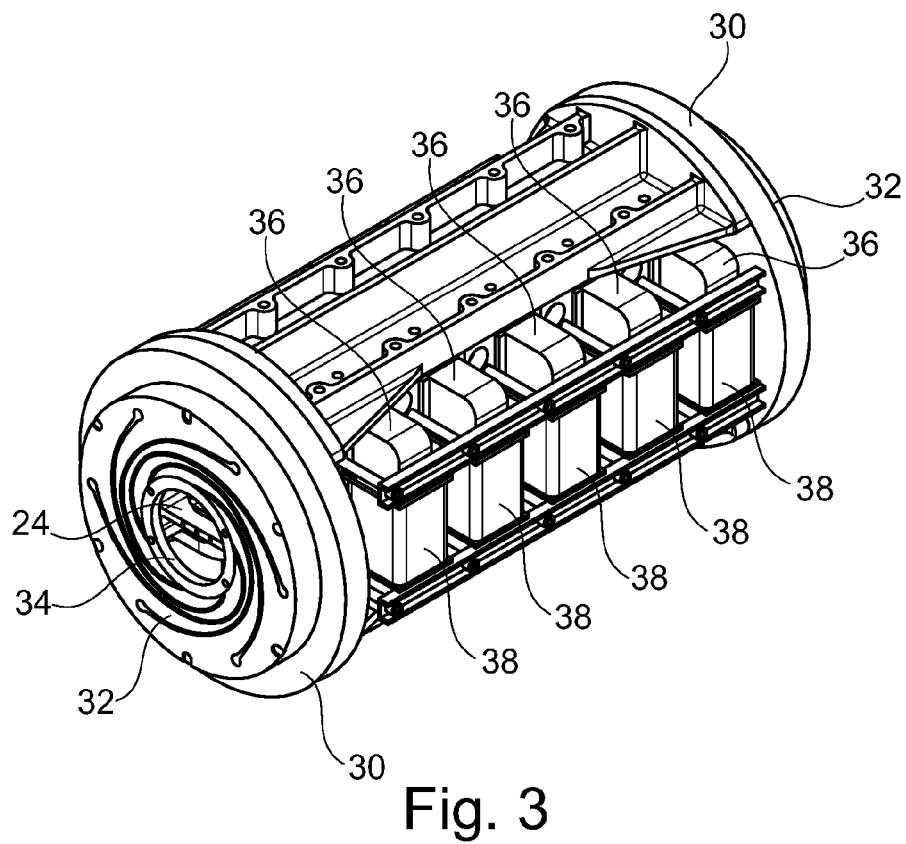
FIG. 3 depicts an electromechanical transducer mounted in a linear suspension system between spiral springs.

FIG. 3 is a schematic solid view of the embodiment shown in FIG. 2. The transducer is shown mounted between flanges 30 and spiral springs 32 of a linear suspension system. In an arrangement of this type, the armature 24 is rigidly connected to an inner rim 34 of the spiral spring 32, which allows for longitudinal movement of the armature 24 relative to the static part of the transducer.

In an embodiment, each of the flux modules 20 comprises a first core defining the gap 22 and a second core 36 supporting coils 38 for linking with or generating flux in the magnetic circuit 22. In an embodiment, the first and second cores are integral with each other. In an alternative embodiment, the second core 36 is detachably connected to the first core. The embodiment depicted in FIG. 3 is of this latter type.

Figure 4:
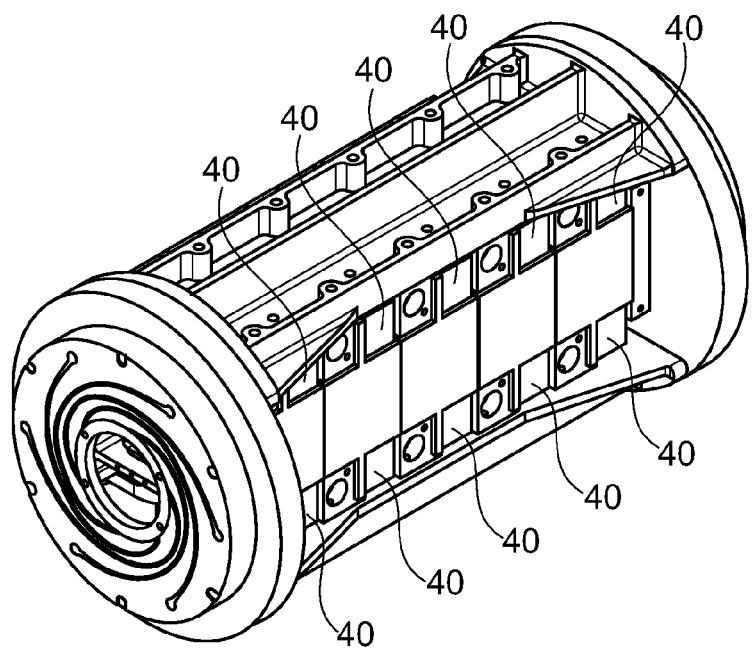
FIG. 4 depicts the transducer of FIG. 3 with detachable second cores removed on a visible side of the transducer.

FIG. 4 depicts the transducer of FIG. 3 with the second cores 36 and corresponding coils 38 detached from the first cores 40.

Figure 5:
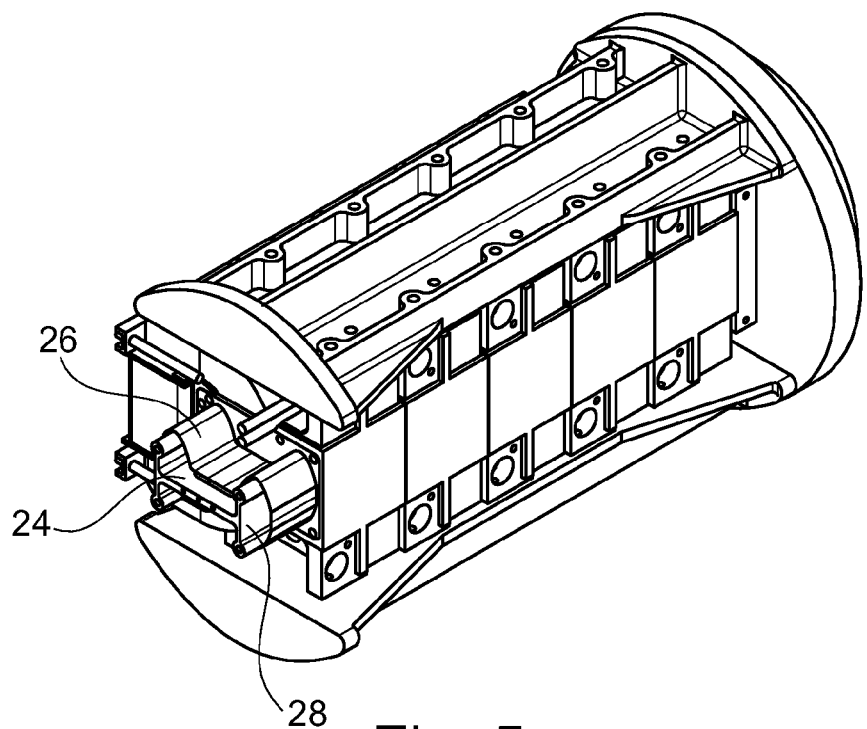
FIG. 5 depicts the transducer of FIG. 4 with the front spiral spring and flange removed to reveal a protruding armature and gas containment structure.

FIG. 5 depicts the transducer of FIG. 4 with the nearest flange 30 and spiral spring 32 removed. Here, the structure of the reinforcing portions 28 of the armature 24 can clearly be seen. In the arrangement as shown, the armature 24 protrudes slightly from the gas containment structure 26.

Figure 6:
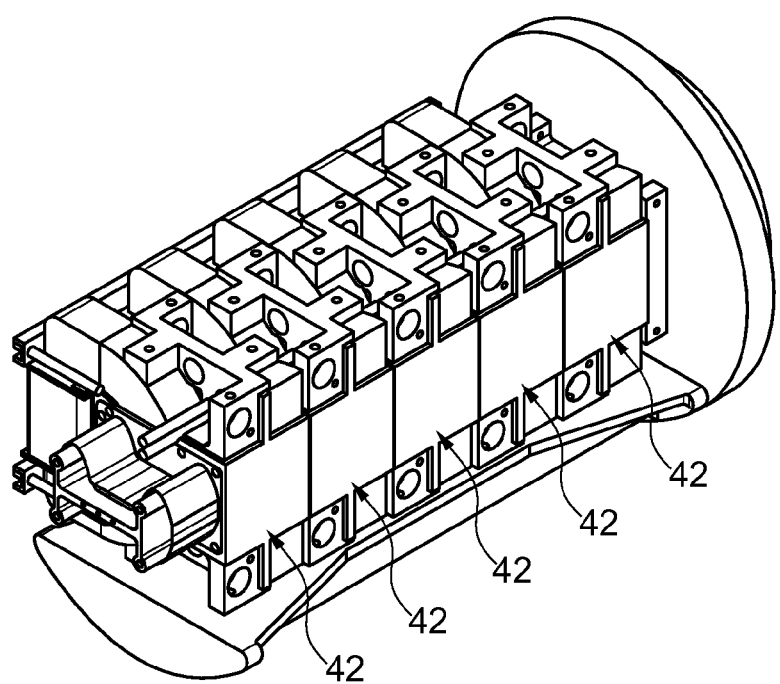
FIG. 6 depicts the transducer of FIG. 5 with the top plate removed to reveal detail of the modular construction.

FIG. 6 depicts the transducer of FIG. 5 with the top plate removed to provide details of the structure of the flux modules. In the embodiment shown, the flux modules are provided in a plurality of flux module pairs 42. Each flux module pair 42 comprises two flux modules 20. In an embodiment, both of the flux modules in each flux module pair 42 are identical. The configuration of an example flux module pair 42 is shown in further detail in FIGS. 11 and 12.

Providing identical flux module pairs facilitates modular construction, thereby reducing manufacturing costs, particularly where it is required to produce devices needing different numbers of flux modules.

Figure 11:
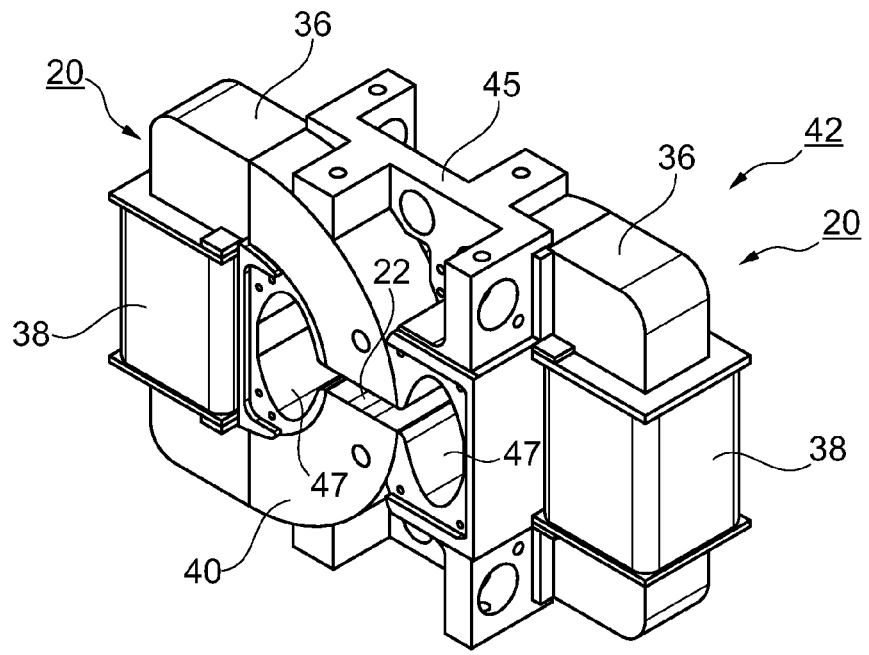
FIG. 11 depicts a complete flux module pair.
Figure 12:
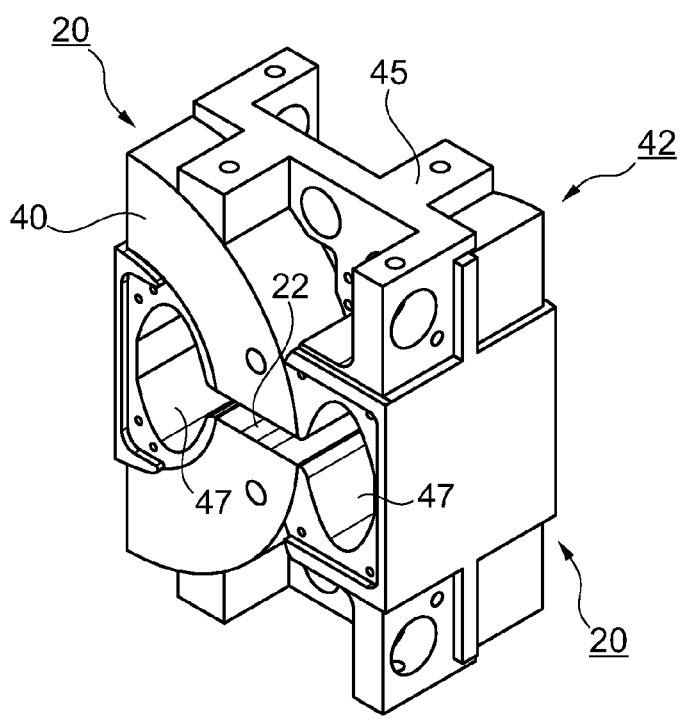
FIG. 12 depicts a flux module pair with second cores removed.

In the embodiment shown in FIGS. 11 and 12, the flux module pair 42 comprises a frame 45 holding together the two flux modules 20 forming the pair 42. Each flux module 20 comprises a first core 40 defining the gap 22 and a second core 36 and associated coils 38 detachably connected to the first core 40 (optionally via the frame 45).

FIG. 11 depicts the flux module pair 42 with the second cores 36 attached. FIG. 12 depicts the flux module pair 42 with the second cores 36 detached. In the embodiment shown, one of the flux modules 20 of the pair 42 comprises coils 38 only on one side of a plane parallel to the width of the gap 22 and lying along the longitudinal axis. The other flux module 20 comprises coils 38 only on the other side of the plane. In this way, the coils 38 of directly adjacent flux modules 20 in the longitudinal direction do not interfere with each other. The detachable coils 38 may therefore be more easily accessed. The increased space around the coils 38 may assist with thermal management of resistive heating within the coils 38, for example via improved convection.

In an embodiment, the flux modules 20 and/or the frame 45 for supporting the flux modules provide a surface that is flush against all of an outer surface of the gas containment structure over a predetermined longitudinal length in order to resist deformation of the gas containment structure due to a pressure difference between the inside and outside of the gas containment structure over the predetermined length. In the embodiment of FIGS. 11 and 12, the inner surfaces 47 of the frame 45 and the inner surfaces of the gap 22 defined in the first core 40 are configured to fit (i.e. be flush) against the outer surface of the gas containment volume 26. Such a fitting be seen in FIGS. 5-7 for example. This fitting requires relatively accurate machining of the first core 40 and frame 45. However, advantageously, the machining required for the second core 36 does not need to be so precise in the case where the second core 36 is configured to be detachable. Configuring the second core 36 to be detachable thus potentially saves cost where the gas containment structure is to be laterally supported in this manner.

In an embodiment, the coils of one of the flux modules 20 of the pair 42 at least partially overlap in the longitudinal direction with the coils 38 of the other flux module 20 of the pair 42. Such overlapping would not be possible if the coils of adjacent flux modules 20 were not located on opposite sides of the longitudinal axis. Increasing the space taken up by a given number of coils facilitates manufacture and installation of the coils and/or may assist with thermal management.

Figure 7:
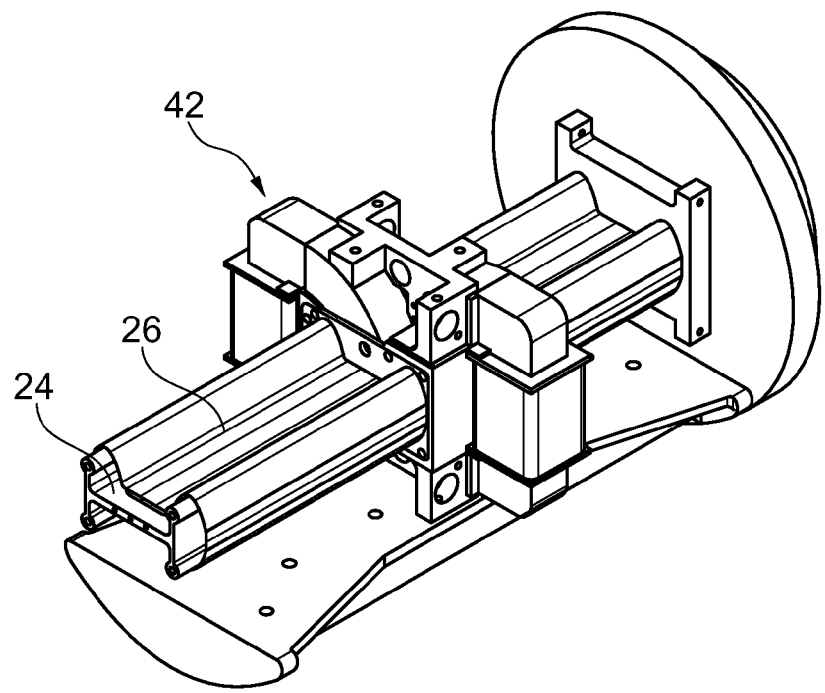
FIG. 7 depicts the transducer of FIG. 6 with all but one of a plurality of flux module pairs removed.

FIG. 7 depicts the arrangement of FIG. 6 with all but one of the flux module pairs 42 removed.

Figure 8:
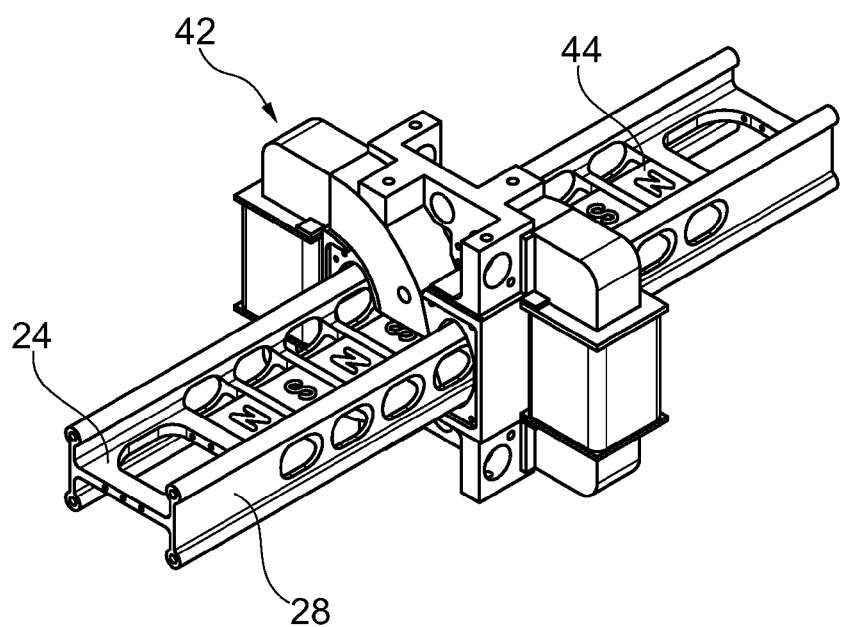
FIG. 8 depicts the armature of the transducer of FIG. 7 with the gas containment structure and rear spiral spring and flange removed.

FIG. 8 illustrates the arrangement of FIG. 7 with all components removed except a single flux module pair 42, the armature 24 and a plurality of magnets 44 mounted within the armature 24. In the embodiment shown, the magnets 44 are arranged so as to have alternating plurality. In this way, by appropriately alternating the flux driven through the magnetic circuits of the flux modules 20, it is possible to drive movement of the armature 24 in the longitudinal direction. Alternatively, where the transducer is operating as generator, longitudinal motion of the permanent magnets through the gaps 22 in the flux modules 20 will cause a changing flux linkage within the coils 38 of the flux modules 20, which will generate an electric current.

Figure 9:
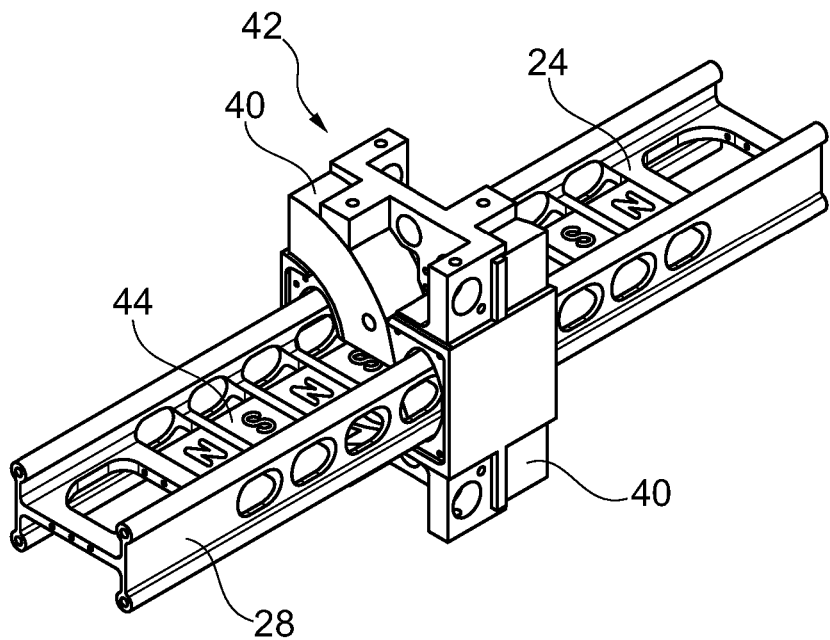
FIG. 9 depicts the armature of FIG. 8 with the second cores of the flux module pair removed.

FIG. 9 depicts the arrangement of FIG. 8 within the second cores 36 and coils 38 removed.

Figure 10:
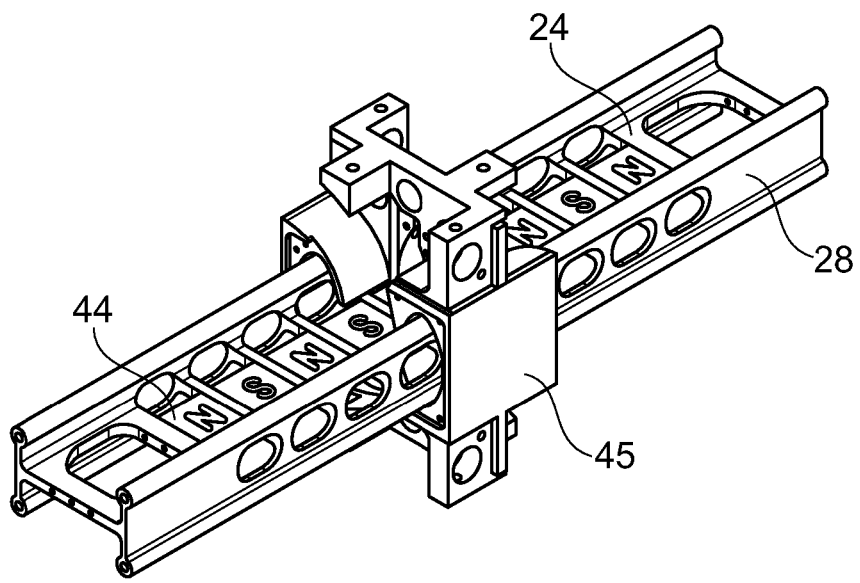
FIG. 10 depicts the armature of FIG. 9 with the first cores of the flux module pair removed.

FIG. 10 depicts the arrangement of FIG. 9 with the first cores 40 removed, leaving only the frame 45 of the flux module pair 42.

In the embodiments described above there are an even number of cores that are grouped as flux module pairs. For example ten cores grouped as five flux module pairs with nine magnets. It is also possible to have an odd number of cores by integrating the odd core into one of the end flanges. For example with nine cores, eight would form four flux module pairs and the ninth could be integrated in to an end flange. The ability to have an odd number of cores allows the power rating of the transducer to be changed in smaller increments. The modular construction allows common components to be used to produce a wide range of power ratings by simply varying the number of cores and corresponding magnets.

Figure 13:
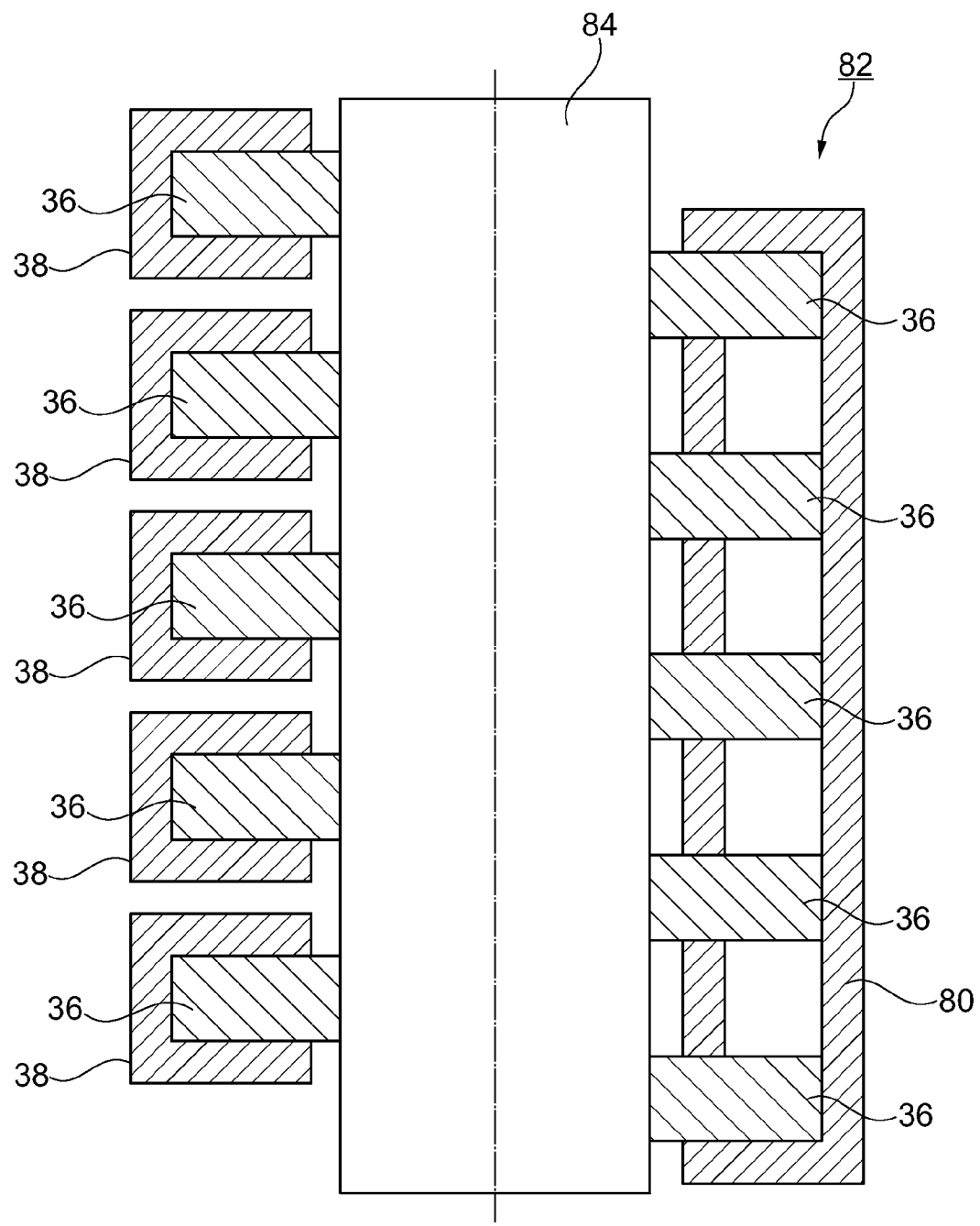
FIG. 13 depicts a plan view of a transducer showing alternative coil arrangements.

In the embodiments described above, each flux module 20 has its own coil 38. However, this is not essential. In other embodiments, coils may be provided that wind around more than one of the second cores. Such coils may comprise loops that "contain" more than one of the second cores (i.e. are such that the two or more second cores pass through the loops). In an example, coils are provided in loops that contain all of the second cores on one side of the transducer. Such embodiments are particularly convenient where the coils on adjacent second cores are to be wound in the same direction. FIG. 13 shows an example of such an embodiment. The axially central part 84 of the transducer, inside of the second cores 36, is not shown in detail for clarity. On the left hand side of the central part 84, individual coil assemblies 38 are provided for each of the second cores 36. This arrangement is thus the same as the embodiments described above with reference to FIGS. 2 to 12. On the right hand side of the central part 84, in contrast, the coils 80 are combined into a single coil assembly 82. The coils 80 form a loop through which all of the second cores 36 on one side of the transducer pass. This configuration is particularly easily achieved where the second cores 36 are detachable. The second cores 36 can be connected together to form the subassembly when in the detached state. Only a single winding operation is then required to add the coils 80. In addition to reducing the number of winding processes this approach can, depending on the coil dimensions, also reduce the amount of conductor required.

The arrangements depicted in FIGS. 2 to 13 are suitable for use in an electric generator or motor (depending on whether there is a net transfer of energy from the moving armature 24 to the coils 38 or vice versa).

Figure 14:
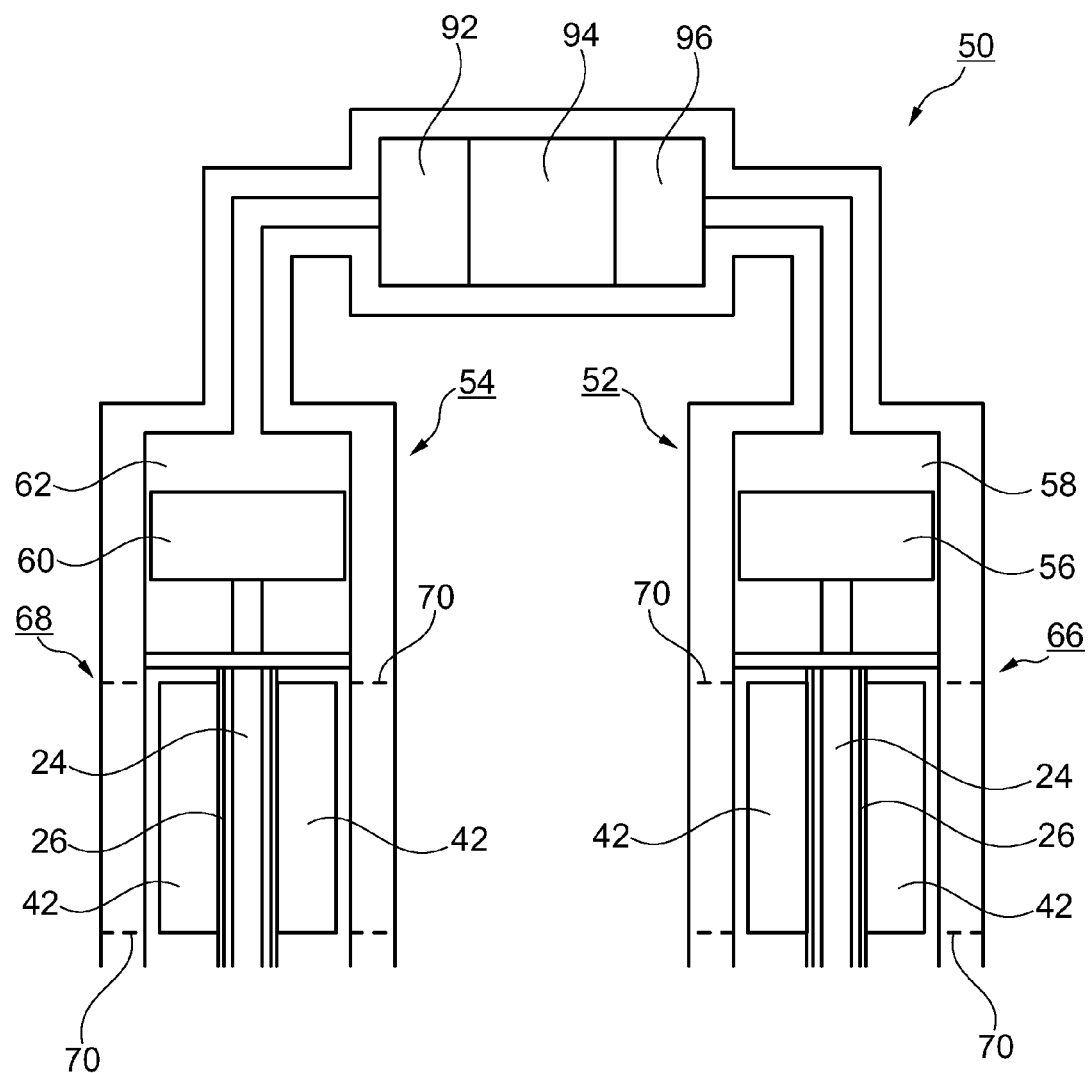
FIG. 14 depicts transducers incorporated into the compressor and expander of a Stirling cycle engine.

In an embodiment, the transducer is configured to operate as part of a Stirling cycle engine. FIG. 14 is a schematic illustration of one possible configuration. In the embodiment shown, the Stirling engine 50 comprises an expander 52 and a compressor 54 connected to a cooler-regenerator-heater assembly (respectively 92,94,96). The expander 52 comprises an expansion piston 56 that is configured to reciprocate within an expansion volume 58. The compressor 54 comprises a compression piston 60 that is configured to reciprocate within a compression volume 62. Two transducers according to an embodiment of the invention are provided to interact respectively with both the expander 52 and the compressor 54 in the embodiment shown. In other embodiments, only a single transducer may be provided to interact either with the expander 52 or with the compressor 54. The transducer 66 configured to interact with the expander 52 is configured to act as linear generator. In this embodiment, the gas containment structure 26 of the transducer 66 is coupled to the expander 52 in order to define a closed volume and the armature 24 is configured to move together with the expansion piston 56. The transducer 68 that is configured to interact with the compressor 54 acts as a linear motor. The pressure containment structure 26 of the transducer 68 is coupled to the compressor 54 in such a way as to define a closed volume and the armature 24 is configured to move together with the compression piston 60.

The invention claimed is:

1. An electromechanical transducer, comprising:
at least two flux modules, each defining a magnetic circuit having a gap;
an armature configured to move along a longitudinal axis passing through the gaps; and
a gas containment structure laterally surrounding the armature, wherein:
the at least two flux modules are provided outside the gas containment structure;
the armature comprises a reinforcing portion laterally outside of the gaps that is wider in a direction parallel to a magnetic flux in the gaps produced in use by the magnetic circuit than at least one of the gaps; and
the gas containment structure is supported by elements that are laterally external to the gas containment structure over a whole outer surface of the gas containment structure for a predetermined longitudinal distance in order to resist deformation of the gas containment structure due to a pressure difference between an inside and an outside of the gas containment structure over the predetermined longitudinal distance.

2. A transducer according to claim 1, wherein:
each of the flux modules comprises a first core defining the gap and a second core for supporting coils for linking with or generating flux in the magnetic circuit of the flux module.

3. A transducer according to claim 2, wherein:
the first and second cores are integral with each other.

4. A transducer according to claim 2, wherein:
the second core is detachably connected to the first core.

5. A transducer according to claim 1, wherein:
the flux modules and/or a frame for supporting the flux modules provide a surface that is flush against all of an outer surface of the gas containment structure over the predetermined longitudinal distance in order to provide the support.

6. A transducer according to claim 1, wherein:
the armature comprises one or more permanent magnets.

7. A transducer according to claim 1, wherein:
the at least two flux modules comprises one or more flux module pairs.

8. A transducer according to claim 7, wherein:
one flux module of the pair comprises coils only on one side of a plane parallel to the width of the gap and the longitudinal axis;
the other flux module comprises coils only the other side of the plane.

9. A transducer according to claim 8, wherein the coils of the one flux module of the pair at least partially overlap in the longitudinal direction with the coils of the other flux module of the pair.

10. A transducer according to claim 1, comprising coils wound in loops that contain two or more of the second cores.

11. A motor, comprising:
a transducer according to claim 1 in which the armature comprises one or more permanent magnets, and
a power source for driving said at least two flux modules to produce magnetic flux in the gaps, the one or more magnets of the armature being configured to generate movement of the armature in response to the generated magnetic flux.

12. A generator, comprising:
a transducer according to claim 1 in which the armature comprises one or more permanent magnets configured such that movement of the one or more magnets through one or more of the gaps generates an electrical current in coils linking flux in the magnetic circuit(s) of the one or more gaps.

13. A Stirling cycle engine comprising:
an expander comprising an expansion piston configured to reciprocate within an expansion volume; and
a compressor comprising a compression piston configured to reciprocate within a compression volume; and
a transducer according to claim 1.

14. An engine according to claim 13, wherein:
the transducer is configured to interact with the compressor as a linear motor.

15. An engine according to claim 14, wherein:
the gas containment structure of the transducer is coupled to the compressor in order to define a closed volume and the armature is configured to move together with the compression piston.

16. An engine according to claim 13, wherein:
the transducer is configured to interact with the expander as a linear generator.

17. An engine according to claim 16, wherein:
the gas containment structure of the transducer is coupled to the expander in order to define a closed volume and the armature is configured to move together with the expansion piston.

18. An electromechanical transducer, comprising:
at least two flux modules, each defining a magnetic circuit having a gap;
an armature configured to move along a longitudinal axis passing through the gaps; and
a gas containment structure laterally surrounding the armature, wherein:
the at least two flux modules are provided outside the gas containment structure;
each of the flux modules comprises a first core defining the gap and a second core for supporting coils for linking with or generating flux in the magnetic circuit of the flux module;
the second core is detachably connected to the first core; and
the gas containment structure is supported by elements that are laterally external to the gas containment structure over a whole outer surface of the gas containment structure for a predetermined longitudinal distance in order to resist deformation of the gas containment structure due to a pressure difference between an inside and an outside of the gas containment structure over the predetermined longitudinal distance.

* * * * *